Aug. 20, 1957  R. C. CLERK  2,803,151
DRIVING SYSTEMS
Filed Aug. 14, 1951  6 Sheets-Sheet 5
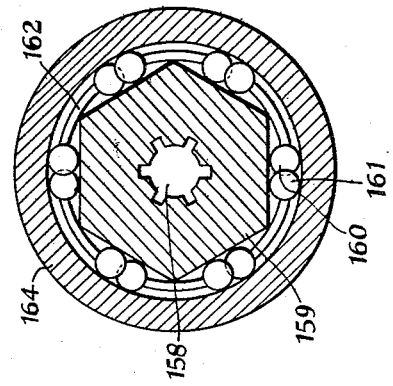
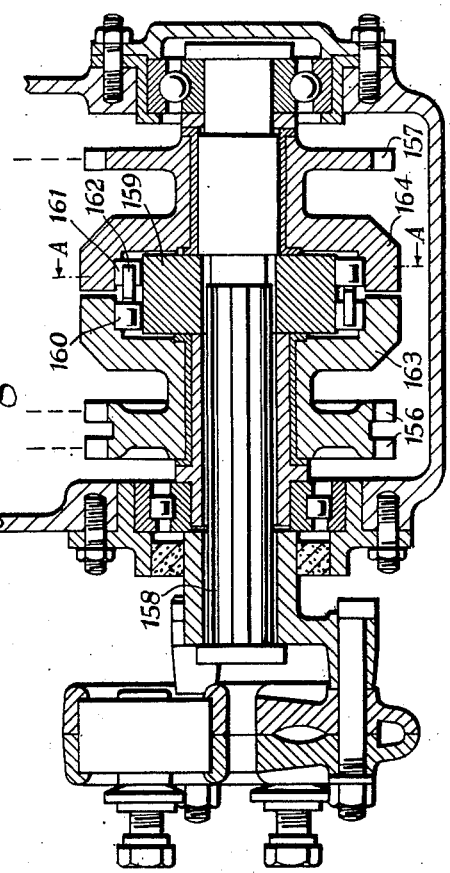
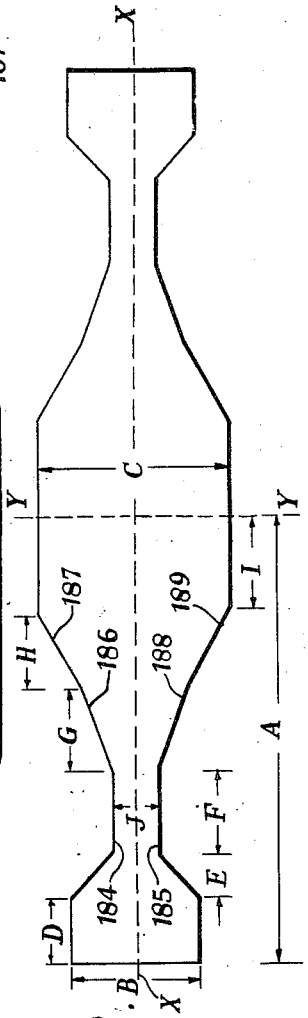
INVENTOR:
ROBERT·CECIL CLERK
By
Richardson, David and Nordon
Atty's

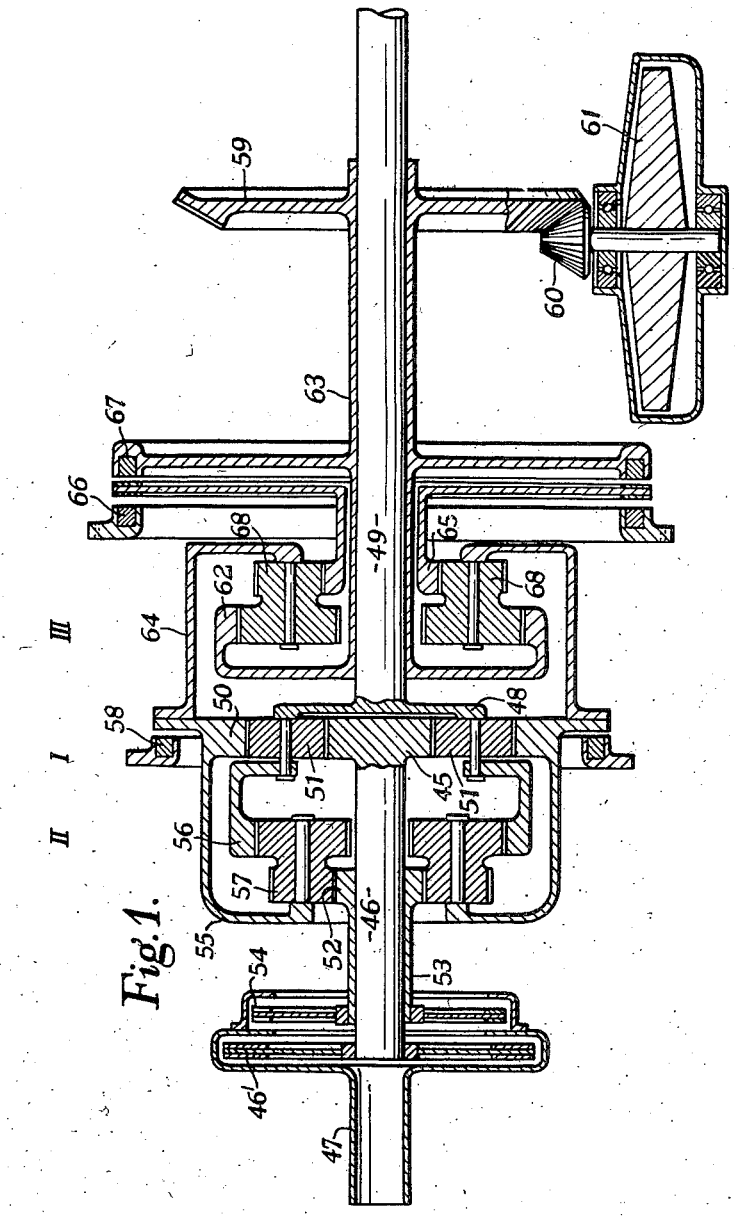

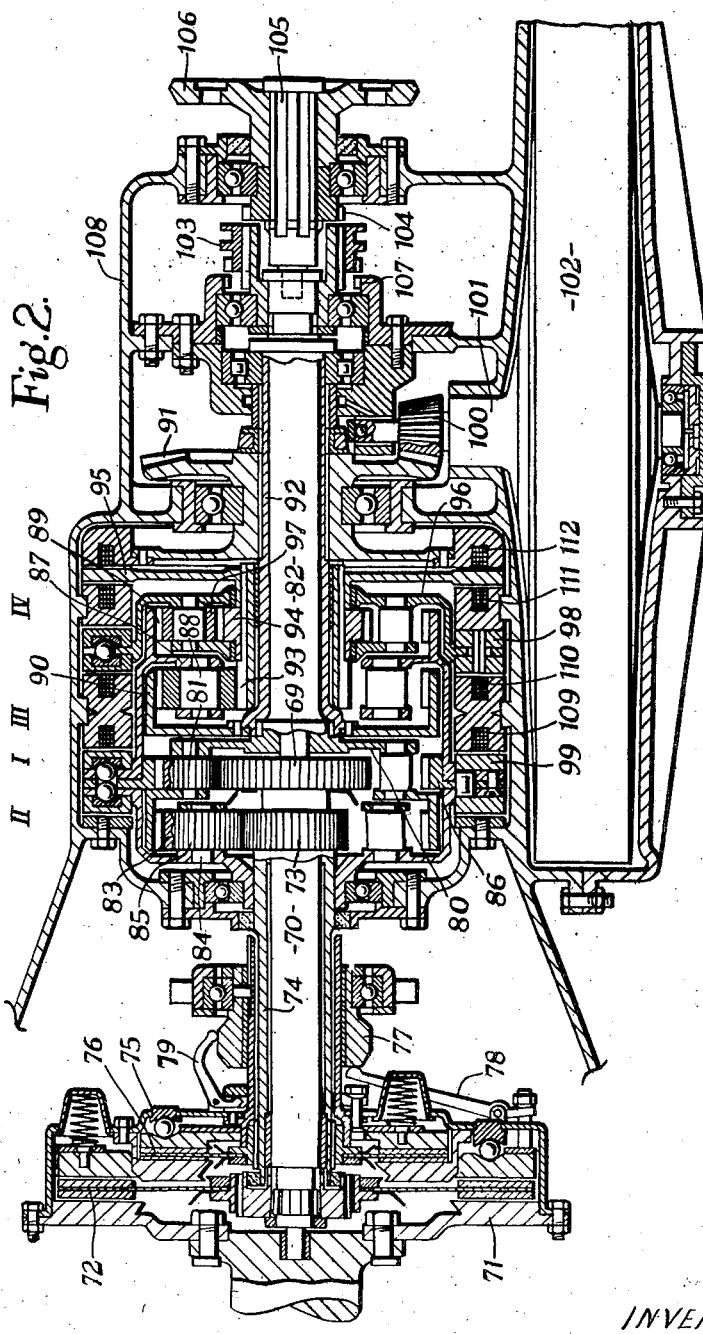

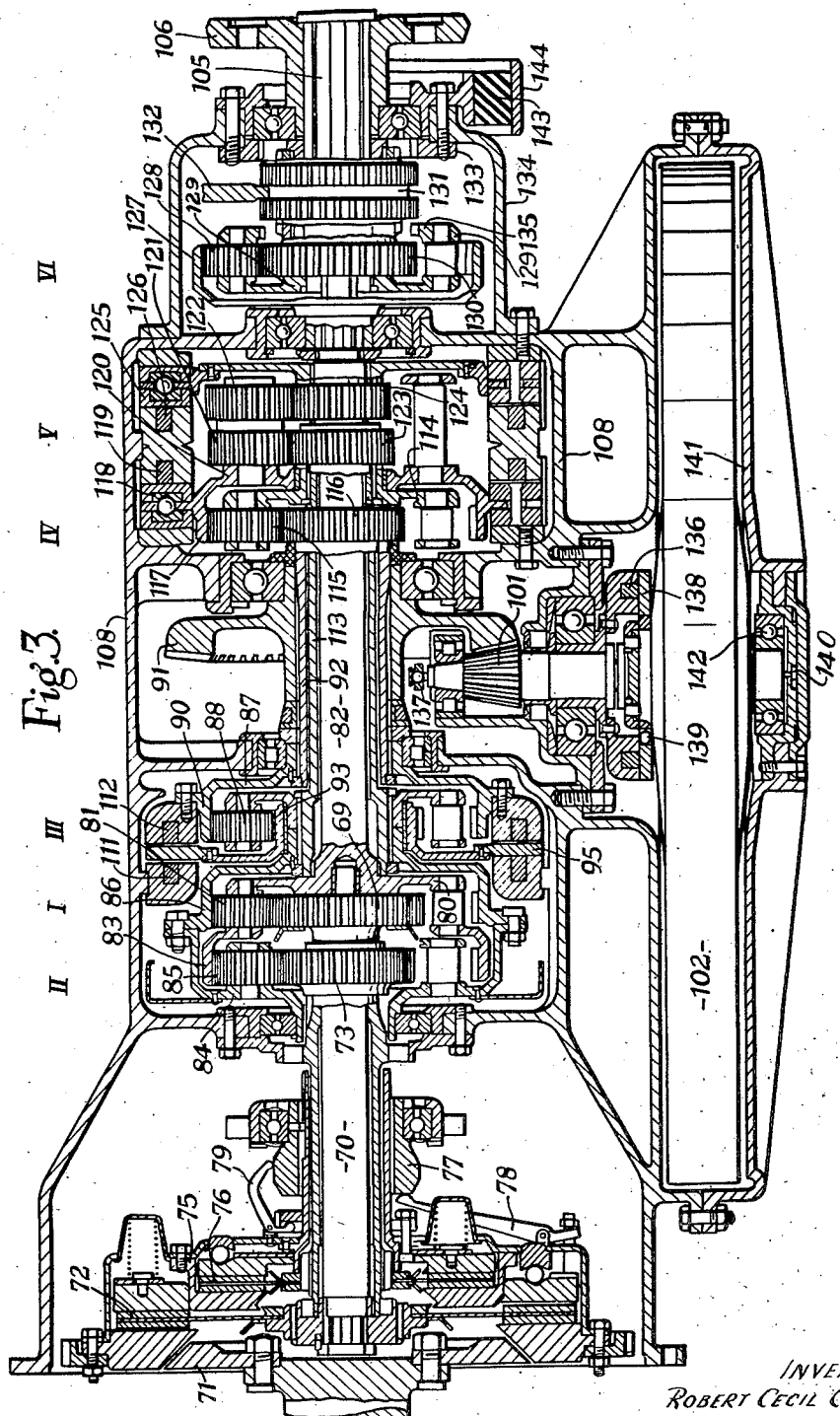

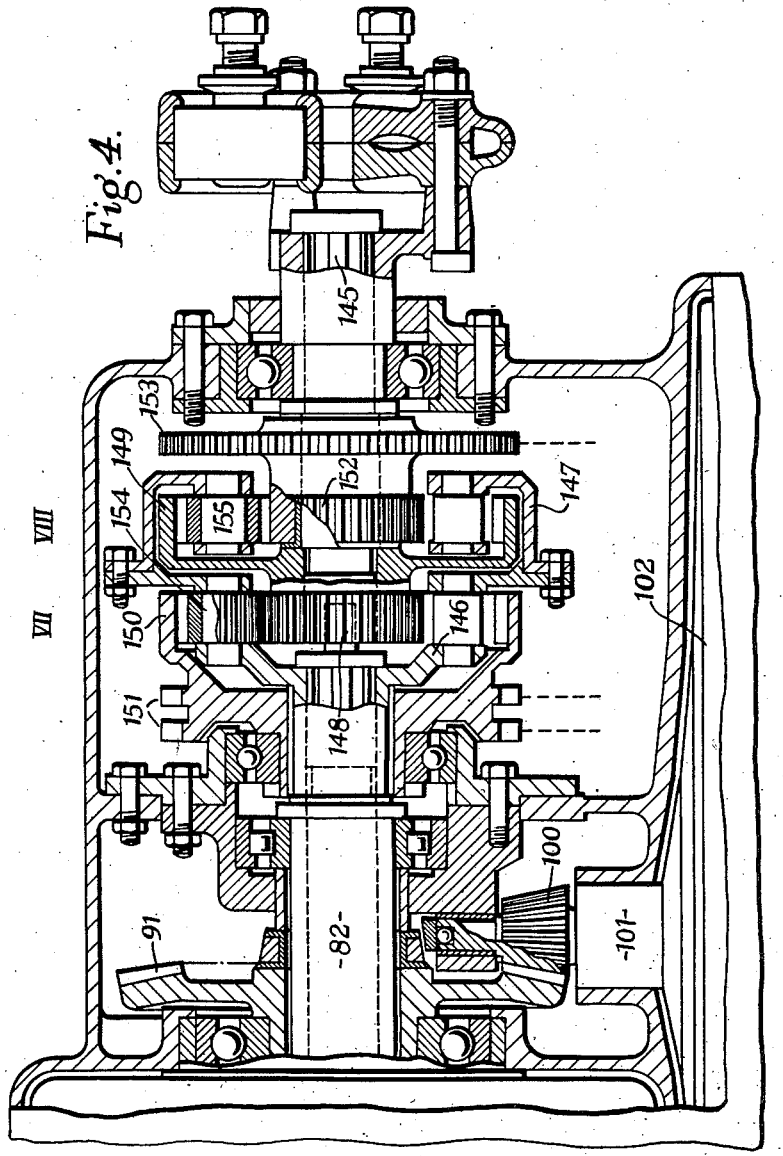

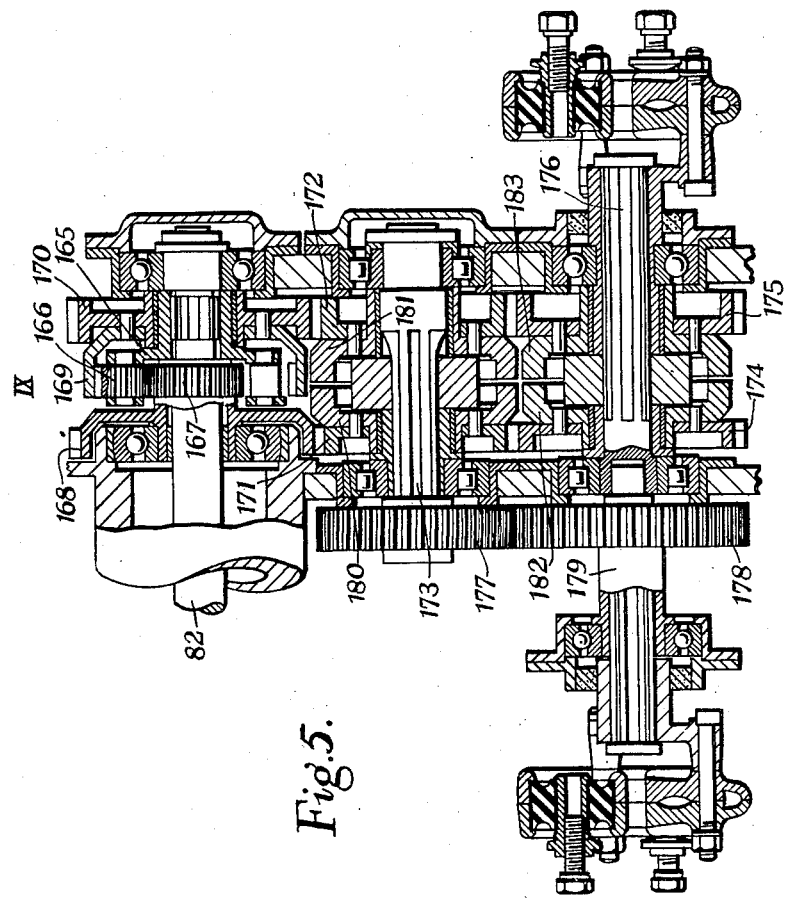

United States Patent Office 2,803,151
Patented Aug. 20, 1957

2,803,151

DRIVING SYSTEMS

Robert Cecil Clerk, Richmond, England, assignor to Gyreacta Transmissions Limited, London, England Application August 14, 1951, Serial No. 241,748

Claims priority, application Great Britain August 23, 1950

8 Claims. (Cl. 74—751)

This invention relates to driving systems, and particularly but not exclusively to propulsion systems for automotive vehicles, the systems being of the type having a flywheel which is independent of the engine or other prime mover and which is capable of storing energy which can be utilised as driving energy. The term "automotive vehicle" includes aircraft, ships and submarine vessels. An object of the invention is to provide an improved system of the type referred to.

Another object is to enable the said flywheel to effect or assist substantially in the acceleration of a vehicle or other member to be driven over a substantial speed range and also to recuperate energy when the vehicle is retarded.

Another object is to enable an automotive vehicle provided with an engine, motor or other prime mover, giving a relatively low power/weight ratio to have, at least for a period, a performance equal to that of a vehicle having a much higher power/weight ratio.

Another object of the invention is to provide a driving system, comprising an engine, motor or other equivalent source of power, in which a member to be driven can be started from a standstill without the need for a slipping clutch or hydraulic or electro-motive drive engagement.

In order that the invention may be well understood and readily carried into effect it will now be described in more detail with reference to the accompanying drawings, in which:

Figures 1 to 5 are views of various forms of propulsion systems according to the invention, and Figure 6 is a view in side elevation of a preferred form of flywheel.

The present invention makes use of trains of three-element planetary gearing, i. e., planetary gearing comprising three rotatable coaxial elements, namely a first gear wheel, a second gear wheel and a planet carrier, the planet carrier having at least one toothed member (which may be a pinion or pinion cluster) journalled on the planet carrier and in meshing engagement with both gear wheels in all angular positions of the planet carrier about the common axis of the said three elements.

In such a train of planetary gearing there is one element, which may be termed the "summation element," which if held stationary causes a reversal of the direction of rotation as between the other two elements when one of said other elements is rotated.

An application of the invention to a land vehicle driven by an internal-combustion engine will now be described with reference to Figure 1. A sports motor car will be considered as an example, the car engine being capable of delivering substantial torque over the speed range 800–5400 R. P. M.

A differential gear controllable to yield two ratios comprises two planetary gear trains I and II. Train I has a sun wheel 45 on a shaft 46 engageable by a friction clutch 46' with the engine shaft 47, a summation element formed by a planet carrier 48 directly connected to an intermediate shaft 49 adapted to drive the vehicle wheels and an annulus gear 50 having twice the number of teeth of the sun wheel 45. The planet-carrier 48 has planet wheels 51 each meshing with the sun wheel 45 and the annulus gear 50. Train II has a sun wheel 52 on a sleeve 53 engageable by a friction clutch 54 with the engine shaft 47, a summation element formed by a planet-carrier 55 which is directly connected to the annulus gear 50 of train I, and an annulus gear 56 which has twice the number of teeth of the sun wheel 52 and which is directly connected to the planet-carrier 48 of train I. The planet-carrier 55 carries compound planet wheels 57 and provides a velocity ratio of 1/1 between the annulus gear 56 and the sun wheel 52 when the planet-carrier 55 is fixed by means of a friction brake 58 engageable to arrest the annulus gear 50 of train I and the planet-carrier 55 of train II.

A bevel gear wheel 59 rotatable about the intermediate shaft 49 meshes with a bevel pinion 60 drivably connected to a flywheel 61 having its axis vertical and arranged as hereinbefore described. The flywheel may weigh 200 lbs., be 20 in. in diameter and have a maximum speed of 30,000 R. P. M. A planetary change-speed gear train III, between the bevel gear wheel 59 and the reaction assembly constituted by the annulus gear 50 of train I and the planet-carrier 55 of train II, comprises an annulus gear 62 directly connected to the bevel gear wheel 59 via a sleeve 63, a summation element formed by a planet-carrier 64 directly connected to the said reaction assembly, a sun wheel 65 capable of being arrested by a friction brake 66 or of being coupled to the annulus gear 62 of train III by a friction clutch 67, and stepped planet pinions 68 yielding a ratio of annulus speed to planet-carrier speed of 2/1 when the sun wheel 65 is held by the brake 66. The bevel gear reduction ratio is 5.5/1 yielding a maximum speed of the bevel gear wheel 59 of 5,400 R. P. M. The bevel gear wheel rotates in the same direction as the engine.

The various running conditions are as follows:

On first gear, only clutch 46' and brake 58 are engaged. The flywheel 61 therefore idles, and the intermediate shaft 49 can be accelerated from rest to 1,800 R. P. M. by the engine alone with a 3-to-1 torque multiplication, via train I which operates as a simple epicyclic gearing.

On second gear, only clutch 46' and brake 66 are engaged. The above-mentioned reaction assembly is therefore rotated forwards by the flywheel 61 at a maximum speed of 2,700 R. P. M. and the intermediate shaft 49 can be accelerated from 1,800 to 3,600 R. P. M. by accelerating the engine. Under these conditions the torque in the intermediate shaft 49 is still 3 times engine torque, the additional power delivered to the intermediate shaft being drawn from the flywheel 61.

On third gear, only clutches 46' and 67 are engaged, the reaction assembly is rotated forwards by the flywheel at a maximum speed of 5,400 R. P. M., and the intermediate shaft 49 can be accelerated from 3,600 to 5,400 R. P. M., again under a torque of 3 times engine torque.

On direct gear, only clutches 46' and 54 are engaged. Consequently gear trains I and II are locked and the intermediate shaft is directly driven by the engine and the flywheel idles.

Regenerative braking is obtained by engaging only clutch 54 and brake 66. The reaction assembly rotates forward at a maximum speed of 2,700 R. P. M. and the engine speed rises from nominally zero to 5,400 R. P. M. as the intermediate shaft 49 is retarded from 5,400 R. P. M. to rest. It will be apparent that during regenerative braking energy is fed to the flywheel 61 both from the intermediate shaft and from the engine.

The arrangement shown in Figure 2 comprises four planetary gear trains indicated at I, II, III and IV. The train I comprises a sun wheel 69 on a shaft 70 which can be clutched to the engine flywheel 71 by means of a clutch plate 72. The train II includes a sun wheel 73 on a sleeve 74 which can be clutched to the engine flywheel housing 75 by means of a clutch plate 76. A clutch thrust collar 77, operable by a fork (not shown), serves to operate, via levers 78 and 79, the clutches 71, 72 and 75, 76 respectively. It has four operating positions which will be described hereinafter. The planet carrier or summation element 80 of train I carries planet pinions 81 and is fast with an intermediate shaft 82 and also with the annulus gear 83 of train II. The planet carrier or summation element 84 of train II carries planet pinions 85 and is fast with the annulus gear 86 of train I, and also with the planet carrier or summation element 87 of train III, the last-mentioned planet carrier 87 carrying planet pinions 88, and with the annulus 89 of train IV. The annulus gear 90 of train III is connected to a bevel gear wheel 91 via a sleeve 92 and the sun wheel 93 of train III is connected to the sun wheel 94 of train IV and to an armature plate 95. The planet carrier or summation element 96 of train IV carries planet pinions 97 which co-operate with the sun wheel 94 and annulus gear 89, and carries a servo-armature 98. The planet carrier 84 of train II and its associated parts 86, 87 and 89 carry a servo-armature 99. The bevel gear wheel 91 co-operates with a bevel pinion 100 which is fitted into an arbor 101 formed integrally with a flywheel 102 which is mounted for rotation about a vertical axis. The intermediate shaft 82 has splined thereon a sliding dog 103, which may be engaged alternatively with dogs 104 fast with the output shaft 105, provided with a driving flange 106, or with dogs 107 fixed to the gear case 108.

The clutch thrust collar 77 is shown in the "free" position, in which it holds both of the clutches 71, 72 and 75, 76 disengaged. If it is moved forward, that is to say from right to left as seen in the drawing, to a position in which clutch 75, 76 is engaged and clutch 71, 72 is still disengaged, then the engine will be drivably connected to the sun wheel 73 of train II (Braking Position). If the clutch thrust 77 is moved rearwardly from the position shown (i. e. to the right) to a position in which clutch 71, 72 is engaged and clutch 75, 76 remains disengaged, the engine is drivably connected to the sun wheel 69 of train I (Accelerating Position). Further rearward movement of the clutch thrust 77 to the right causes clutch 75, 76 to become engaged as well as clutch 71, 72, so that the engine is drivably connected to the sun wheels 69 and 73 of both of the trains I and II (Direct Drive Position). The conditions arising in the three last-mentioned positions of the clutch thrust collar 77 will now be considered in detail.

*Accelerating position*

If an electro-magnet 109 fixed with respect to the gear case 108 is energised, thereby holding stationary the armature 99 and with it the annulus 86 of train I, then the sun wheel 69, planet carrier 80 and planet pinions 81 will operate as an epicyclic reduction gear providing a ratio of approximately 3:1 from the engine to the intermediate shaft 82, and an engine speed range say from zero to 4,500 R. P. M. will correspond to a speed range of the intermediate shaft from zero to 1,500. If the dog 103 is engaged with dogs 104, the intermediate shaft will be coupled to the driving flange 106 which will accordingly drive the vehicle wheels. If the magnet 109 is de-energised and instead an electro-magnet 110, forming part of the same unitary structure as electro-magnet 109, is energised, the annulus 86 of train I is connected to the flywheel 102, since the armature 98 and planet carrier 97 of train IV are held stationary, so that trains II and III are coupled, providing a ratio of approximately 2.1:1 between the bevel gear wheel 91 and the annulus 86. Thus if the bevel wheel 91 is driven by the flywheel 102 at approximately 4,500 R. P. M. the annulus 86 of train I will be rotated at approximately 2,150 R. P. M. in the same direction as the sun wheel 69 of train I. The torque ratio between the engine and the intermediate shaft 82 will still be 1:3 but the speed range of the intermediate shaft will be translated to between 1,500 and 3,000 R. P. M. corresponding to the engine speed range of zero to 4,500 R. P. M. The engine torque transmitted through train I will have an epicyclic reaction measured at the the annulus gear 86 of train I of approximately twice the developed engine torque, and this reaction torque will be attempting to resist rotation of the annulus gear 86. However, the high inertia of the flywheel 102, which is assumed to be running at approximately 22,500 R. P. M., will operate against this reaction torque so that the annulus gear 86 does not slow down appreciably during the period required to accelerate the vehicle over the speed range embraced when electro-magnet 110 is energised.

If electro-magnet 110 is de-energised and an electro-magnet 111, also fast to gear case 108, is energised, thereby holding stationary the armature 95 and the sun wheel 93 of train III, then the bevel gear wheel 91 will drive the annulus gear 86 of train I via train III (operating as a simple epicyclic under-drive gearing), giving a ratio of approximately 1.4:1 from bevel gear wheel 91 to annulus gear 86, so that the latter will be rotated at approximately 3,300 R. P. M. corresponding to a speed of 4,500 R. P. M. of the bevel gear wheel. The engine will still drive the intermediate shaft 82 with a torque ratio of approximately 1:3 via train I, but by virtue of the rotation of the annulus 86 the speed range of the intermediate shaft 82 will be translated to between 2,200 and 3,800 R. P. M. corresponding to the engine speed range of zero to 4,500 R. P. M.

If electro-magnet 111 is de-energised and an electro-magnet 112, fast with the bevel gear wheel 91, is energised, the annulus gear 86 of train I will be driven by the bevel gear wheel 91 at a 1:1 ratio since train III will be locked to the bevel gear wheel 91 and train IV will be inert. In this condition the engine will still drive the intermediate shaft 82 with a torque ratio of 1:3 but the speed range of the intermediate shaft 82 will be translated to between approximately 3,000 and 4,500 R. P. M., corresponding to the engine speed range of zero to 4,500.

*Direct drive position*

When the clutch thrust 77 is in the extreme right-hand position, so that both clutches 71, 72 and 75, 76 are engaged and the engine is connected to both sun wheels 69 and 73, then since the annulus gear 83 of train II is connected to the planet carrier 80 of train I, the trains I and II will be locked together by the interaction of the aforesaid clutches, providing a 1:1 drive between the engine and the intermediate shaft 82, and if none of the electro-magnets is energised there will be no driving connection between the engine and the flywheel 102.

*Braking position*

When the clutch thrust 77 is in the extreme left-hand position, so that the engine drives through clutch 75, 76 to sun wheel 73 of train II, and assuming that the vehicle is in motion so that the intermediate shaft 82 is revolving at say 2,000 R. P. M., then if magnet 110 is energised to hold servo-armature 98 and planet carrier 96 of train IV, the flywheel 102 will be connected via bevel wheel 91, to annulus 83 of train II, so that planet unit 84 is driven at approximately 2,100 R. P. M. in the same direction of rotation as the engine. In this condition any torque exerted by the engine at sun wheel 73 is transmitted to annulus 83 of train II as a negative or retarding torque, although the rotation of annulus 83 is still positive, i. e. in the same sense as the engine. With the said magnet 110 energised, therefore, the full range of engine speed from zero to 4,500 will be provide retardation of the intermediate shaft 82 over a speed range of the intermediate shaft 82 between approximately 2,850 and 1,150 R. P. M.

It should be pointed out that both the developed engine torque at sun wheel 72 and the retarding torque imposed on the intermediate shaft 82 via annulus 83 of train II are together transmitted to the planet carrier 84 and from the latter via trains III and IV, working as a coupled epicyclic gear, to bevel wheel 97 and flywheel 102 with the effect of increasing the flywheel revolutions and so storing kinetically the energy both from braking the vehicle and from the controlling engine torque.

If the vehicle is moving at a higher velocity than would correspond to the above-mentioned speed range of the intermediate shaft 82, the magnet 111 may be energised instead of magnet 110 so that the bevel wheel 91 is connected to the planet carrier 84 of train II via train III operating as a simple planetary underdrive, so that planet carrier 84 revolves at approximately 3,300 R. P. M., under which conditions the speed range of the engine from zero to 4,500 R. P. M. will correspond to a speed range of the intermediate shaft between 4,500 and 2,700 R. P. M. whilst retarding the vehicle, and storing the energy, as mentioned previously, in the flywheel.

In this particular example the regenerative braking is not used to bring the vehicle to a standstill, although to achieve this it is only necessary to choose appropriate gear ratios in trains II, III and IV.

*Initial storage of energy*

In the foregoing, it has been assumed that flywheel 102 is already revolving steadily at approximately 22,500 R. P. M., which it would continue to do for a considerable period without appreciable loss if left running free. However, initially, or if the vehicle has been out of use for some days, it will be necessary to initiate rotation of the flywheel 102 or to increase its speed to the normal running figure of 22,500 R. P. M.

This is achieved, assuming the engine has already been started and the dog 103 is locked to stationary dogs 107, by moving the clutch thrust 77 to the extreme left-hand position as for "Braking," and energising the magnet 112, which as previously mentioned provides 1:1 ratio between planet carrier 84 and bevel wheel 91, so that engine power is transmitted from sun wheel 73 through train II (acting as a simple epicyclic low gear of ratio approximately 3.4:1 from the sun wheel to the planet carrier) via planet carrier 84 and bevel wheel 91 to the flywheel 102. In this condition the full engine speed range from zero to 4,500 will correspond to increase of flywheel speed from zero to 6,200 R. P. M. By subsequently energising magnet 111 instead of 112 so as to alter the advantage between planet carrier 84 and bevel wheel 91, the flywheel speed can be increased further to 8,800 R. P. M. whereas if magnet 110 is alternatively energised the full engine speed of 4,500 R. P. M. will correspond to 14,000 R. P. M. of the flywheel.

At this stage the dog 103 is moved to the free position and clutch thrust 77 is moved to the extreme right-hand position, so that trains I and II are locked together and provide a 1:1 ratio from the engine both to the free intermediate shaft 82 and to the assembly of planet carrier 84 and annulus 86. If, further, electro-magnet 112 is again energised alternatively to the other electro-magnets, there will also be 1:1 drive between the assembly of planet carrier 84 and annulus 86 and the bevel wheel 91, so that the bevel wheel 91 will be driven at engine speed, which will allow the flywheel to be accelerated up to 22,500 R. P. M. corresponding to maximum engine speed.

Figure 3 shows a variation of Figure 2 in which the clutches 71, 72 and 75, 76 together with the operating mechanism 78, 79 and clutch thrust 77 are identical with the similarly numbered parts of Figure 2, as also are trains I and II, excepting that the assembly comprising planet carrier 84 of train II and annulus 86 of train I does not include a servoarmature mechanism for holding the assembly fast to the gear case, but instead said assembly is connected by sleeve 113 both to planet carrier 87 of train III and to planet carrier 114 of train IV, which is in this case situated on the side of bevel gear wheel 91 remote from train III. The planet carrier 114 of train IV has planet pinions 115 which co-operate with sun wheel 116 fast on sleeve 92, and with an annulus gear 117 which carries a servo-armature 118 capable of being arrested by an electro-magnet 119 fast with the gear case 108. The annulus gear 117 is fast with the planet carrier 120 of a gear train V, the carrier 120 carrying compound planet pinions 121, 122, of which 121 has the fewer teeth and co-operates with a sun gear 123 fast on sleeve 113. The larger pinion 122 of the compound planet pinions co-operates with a sun gear 124 forming an assembly with a servo-armature 125 which is capable of being arrested by an electro-magnet 126 fast with the gear case 108.

The clutch thrust 77, as in the case of Figure 6, has four operating positions corresponding respectively, from right to left, to direct drive, accelerating, free (as shown) and braking. The two conditions of braking are identical with those described with reference to Figure 6, although the ratios in the present instance allow regenerative braking down to zero output speed.

The initial storage conditions are also identical with those of Figure 6 excepting that the first three stages of the storage operation, with the clutch thrust 77 in braking position and with the intermediate shaft 82 held stationary with the vehicle by the engagement of sliding dog 131 either with dogs 133 or 135 and the application of the vehicle brakes, suffice to bring the flywheel up to the reduced normal speed of 15,000 R. P. M.

In the case of the accelerating position, if magnet 126 is energised to hold armature 125 and sun wheel 124 of train V, the latter train will run coupled with train IV to provide a very low reduction from bevel wheel 91 to sun wheel 123, sleeve 113 and annulus gear 86 of train I, with reversal of direction the ratio being approximately 11.5 to —1. As the bevel gear ratio is such that for 15,000 R. P. M. of the flywheel the bevel gear wheel 91 rotates at approximately 2,300 R. P. M. in the same direction as the engine flywheel then with electro-magnet 126 energised the annulus 86 of train I will rotate at approximately 200 R. P. M. in the opposite direction of rotation.

If the vehicle and consequently the intermediate shaft 82 and planet carrier 80 are stationary, then sun wheel 69 of train I will be driven via planet pinions 81 in the opposite direction of rotation to annulus 86, and at a correspondingly higher speed, i. e. it will be rotated in the same direction as the engine flywheel at approximately 340 R. P. M. It will therefore be apparent that if the engine were governed to idle at 340 R. P. M. clutch 71, 72 could be engaged to couple the engine flywheel with shaft 70 and sun gear 69 without any power being transmitted from the flywheel 102 to the engine flywheel 71 or vice versa, and with the intermediate shaft 82 and the vehicle wheels stationary.

However, if the flywheel should be running at revolutions in excess of the normal 15,000 R. P. M., then sun wheel 69 could be driven correspondingly faster than 340 R. P. M. and with clutch 70, 71 engaged would drive the engine flywheel also at this higher speed, causing the engine governor to cut off the supply of fuel to the engine so that the engine will be driven at above idling speed entirely by the energy of flywheel 102, which will in consequence reduce the excess revolutions of the latter.

Conversely, if the flywheel 102 should be running at below the normal revolutions, sun wheel 69 will be held below 340 R. P. M. and with clutch 71, 72 engaged the engine will likewise be held below its governed idling speed, so that the action of the governor will be to increase the fuel supply and the engine will therefore drive sun wheel 69 and, via annulus 86, trains IV and V and the bevel gear wheel 91, will impart energy to the flywheel 102, causing it to increase its revolutions.

However, the mechanical advantage from the engine flywheel 71 to the inertia flywheel 102 is so low that even the full torque of the engine will only serve to provide a low rate of increase of the inertia flywheel revolutions, but such engine torque being transmitted through train I will apply a turning moment to the planet carrier 80 and intermediate shaft 82 approximating to 2.75:1, this being the planetary ratio of train I.

If the vehicle brakes were released this engine torque applied to the vehicle axle and wheels would cause the vehicle to be set in motion and to accelerate, over a speed range, measured at the intermediate shaft, of zero to 680 R. P. M. corresponding to an engine speed range between 340 R. P. M. and 2,200 R. P. M. for the present example. During the period of time required to accelerate over this speed range the inertia flywheel 102 would increase its speed by rather less than 70 R. P. M., which would be reflected at the annulus 86 of train I by an increase of less than 1 R. P. M.

If electro-magnet 126 is de-energized and instead electro-magnet 119 is energised to hold armature 118 and annulus 117 of train IV stationary, the latter will operate as a simple epicyclic low gear, providing a ratio between bevel gear wheel 91 and annulus 86 of train I of approximately 3.2 to 1, so that annulus 86 will be caused to rotate at approximately 730 R. P. M. corresponding to 15,000 R. P. M. of the inertia flywheel 102. In this condition the speed range of the intermediate shaft 82 will lie between approximately 450 and 1,250 R. P. M. corresponding to the full range of engine speed from zero to 2,200 R. P. M., and the reaction of train I at the annulus 86 will be imparted to the inertia flywheel 102 with the effect of reducing its revolutions by approximately 220 R. P. M. within the period required to accelerate over this speed range.

If electro-magnet 111 is energised alternatively to electro-magnet 119, the speed range of the intermediate shaft 82 will be further translated in the manner described with reference to Figure 6, with the torque ratio between shaft 70 and intermediate shaft 82 maintained at 1:2.75. If electro-magnet 112 is alternatively energised the speed range will be still further translated so that the intermediate shaft will operate between 1,450 and 2,200 R. P. M.

Between the intermediate shaft 82 and the output shaft 105 is introduced a gear train VI the purpose of which is solely to provide an alternative overall low range of speeds for the output shaft in addition to the 1:1 ratio and neutral or free position. This train VI comprises an annulus gear 127 fast with the intermediate shaft 82, and co-operating with planet pinions 128 carried by a planet carrier or summation element 129 fast on the output shaft 105. The planet pinions 128 also co-operate with a sun gear 130 which carries a sliding dog 131 which may be moved by a fork 132 from the free position shown, to the right to engage dogs 133 fast with an extension 134 of the gear case 108, or to the left to engage dogs 135 formed on the planet carrier 129.

Whatever conditions obtain in the clutch thrust positions earlier described, the torque ratio between intermediate shaft 82 and output shaft 105 may be either 1:1 when sliding dog 131 engages dogs 135 to lock train VI, or approximately 1.6:1 when sliding dog 131 is moved to the right to engage fixed dog 133 so that sun wheel 130 is held stationary, allowing train VI to operate as a simple planetary underdrive gear.

In the present example the bevel pinion 101 is shown separately journalled from the flywheel 102, and is provided with an electro-magnet 136 energised via a contact 137 and cooperating with an armature 138 rotationally fixed to the flywheel 102 by keying balls 139 which allow axial movement of the armature 138 with respect to the flywheel 102. The purpose of this arrangement is that when the vehicle is out of service the electro-magnet 136 may be de-energised so as to allow the flywheel 102 to run free without causing rotation of the bevel pinion 101, bevel gear wheel 91 and other associated elements.

In all the foregoing arrangements it is preferred that the flywheel 102 should run within an evacuated enclosure, and for this purpose, as shown in Figure 3, a small pump 140 serves to scavenge any lubricant and air which may enter the enclosure provided between gear case 108 and flywheel casing 141.

As the flywheel 102 runs on an anti-friction footstep bearing 142 the resistances which might cause loss of revolutions at the flywheel 102, when the isolating clutch 136, 138 is deenergised, will be very small so that the flywheel may continue running for a period of approximately 20 days.

In view of the considerable gyroscopic stability of the inertia flywheel 102 when running at its normal revolutions, which stability is imparted to the gear case and any other part of the vehicle rigidly attached thereto, it is advisable, in order to accommodate rolling or lateral tipping of the vehicle without imposing unduly severe loads on the bearings supporting the flywheel 102, to provide a means of supporting the gear case 108 which will allow the latter freedom to maintain its angular position about a fore and aft axis irrespective of the angular rolling of the vehicle about said axis, while still transmitting torque reaction from the gear case to the vehicle. Figure 3 shows a well-known means for achieving angular resilience of the vehicle engine and transmission unit, the said means including rubber or other flexible elements 143 preloaded radially so as to support the weight of the unit on or within a member 144 of the vehicle frame. This also allows a certain freedom in fore and aft pitching as the effect of such pitching is to cause gyroscopic precision in a plane transverse to the fore and aft axis of the vehicle, in which plane the gear case 108 is allowed limited angular movement about said axis by the support 143, 144.

The regenerative retardation should preferably be applied to all four road wheels and in fact due to the effective transference of the weight of the vehicle towards the front it is desirable that during heavy retardation the greater proportion of the braking should be applied to the front wheels. On the other hand, the high positive acceleration provided over the whole speed range from starting to maximum speed causes a weight transference towards the rear, which makes it desirable that the greater proportion of driving torque should be applied to the rear wheels.

To achieve these two desiderata, a drive automatically differentiating as between front and rear wheels may be provided as shown in Figures 4, 4A and 4B. Two planetary gear trains VII and VIII are provided between the intermediate shaft 82 and the coaxial output shaft 145, directed to the rear wheels, the planet carrier or summation element 146 of train VII and the planet carrier or summation element 147 of train VIII being connected together and to the intermediate shaft 82. A sun wheel 148 of train VII and an annulus gear 149 of train VIII are fast on the output shaft 145. An annulus gear 150 of train VII is journalled on intermediate shaft 82 and carries a duplex chain wheel 151 whereas sun wheel 152 of train VIII is journalled on the output shaft 145 and carries a single chain wheel 153. The planet carrier 146 carries planet pinions 154 co-operating with sun wheel 148 and annulus gear 150 of train VII, and the planet carrier 147 carries planet pinion 155 co-operating with sun wheel 152 and annulus gear 149 of train VIII. Train VII, which is effective during regenerative retardation as will be later explained, has a ratio between the tooth members of the annulus gear 150 and sun wheel 148 proportional to the effective weight distribution as between front and rear wheels of the vehicle at the highest rate of retardation, whereas train VIII, which is effective during acceleration of the vehicle, has a ratio as between the annulus gear 149 and the sun wheel 152 proportional to the effective weight distribution between rear and front wheels at the highest rate of acceleration.

A duplex chain, indicated by the chain-dotted lines, drivably connects the duplex chain wheel 151 with a duplex sprocket 156 (Figure 4A) and a single chain connects the chain wheel 153 to a sprocket 157 journalled, as is sprocket 156, on an output shaft 158 for driving the front wheels. A camming element 159 is fast with the output shaft 158 and co-operates with two sets of rollers 160, 161 disposed side by side but held in staggered angular relationship by a cage 162. The rollers 160 co-operate with the cylindrical inner surface of a drum 163 fast with the duplex sprocket 156 and the rollers 161 co-operate with the cylindrical inner surface of a drum 164 fast with the sprocket 157.

The rotation in forward driving is denoted by the arrow on Figure 4B, and when driving torque is applied to the drum 164 by the sprocket 157 in the driving direction, the rollers 161 are constrained to jam between drum 164 and the camming element 159, thereby transmitting the driving torque to shaft 158 and to the front wheels. The driving torque on sprocket 157 is transmitted to it by the chain from chain wheel 153 and sun wheel 152, but due to the balancing effect of the planet pinions 155 carried on the planet carrier 147 of train VIII a proportionately greater torque will be transmitted from the planet pinions 155 to the annulus gear 149 which drives directly the rearward output shaft 145.

When the torque in the intermediate shaft 82 and planet carrier 147 is reversed, as during regenerative braking the planet pinions will tend to drive the annulus gear 149 and the sun wheel 152 in the opposite sense. However, sun wheel 152, which is connected by chain wheel 153 and sprocket 157 and drum 164 to the camming rollers 161, will cause said rollers to move to a free position when the torque sense is reversed, whereas the alternative rollers 160, which are sensitive in the opposite direction, will jam between the camming element 159 and the drum 163 so that the reversed turning moment will be transmitted to said drum 163 by way of duplex sprocket 156, duplex chain wheel 151 and annulus gear 150 of train VII. The torque load at said annulus gear 150 is balanced through pinions 154 by a proportionately lower torque at sun wheel 148 on shaft 145 directed to retard the rear wheels. The front wheel driving shaft 158 is offset from the shaft 82 and may extend alongside the engine. The left-hand part of the system shown in Figure 4 may be similar to the left-hand part of Figure 3.

The arrangement shown in Figures 4, 4A and 4B may be modified as shown in Figure 5, wherein a single planetary train IX is utilised for cases where the weight transfers during acceleration and braking are substantially equal. In Figure 5, the intermediate shaft 82 is solid with a planet carrier 165 of the said train IX, said carrier carrying planet pinions 166 which mesh with a sun wheel 167 fast with a transfer gear wheel 168. An annulus gear 169 is solid with transfer gear wheel 170. The transfer gear wheels 168 and 170 mesh respectively with gear wheels 171 and 172 respectively pournalled on an idler shaft 173, and gear wheels 171 and 172 mesh with gear wheels 174 and 175 journalled on a driven shaft 176. A gear wheel 177 fast on the idler shaft 173 meshes with a gear wheel 178 fast on a front driven shaft 179 which is conveniently coaxial with the rear driven shaft 176. A pair of oppositely acting unidirectional clutches 180 and 181, which may be similar to those shown in Figures 4A and 4B, serve to drivably connect gear wheels 171 and 172 alternatively with idler shaft 173, gear wheels 177 and 178 and front driven shaft 179, and a further pair of oppositely acting unidirectional clutches 182 and 183, similar to clutches 180 and 181, serve to connect gear wheels 174 and 175 alternatively to the rear driven shaft 176. Thus when the intermediate shaft 82 is transmitting forward driving torque, the greater part is transmitted via the annulus 169 of train IX, and gear wheels 170, 171 and 172 to the rear driven shaft 176, while the lesser part is transmitted from the sun wheel 167 via gear wheels 168, 171, 177 and 178 to the front driven shaft 179. When the driving torque is reversed, either by cutting off the engine fuel supply or by applying regenerative braking as previously described, the greater part of this reversed torque is transmitted from the annulus gear 169 of train IX via gear wheels 170, 172, 177 and 178 to the front driven shaft 179, and the lesser part is transmitted via gear wheels 168, 171 and 174 to the rear driven shaft 176.

In the arrangement of Figure 5 both the front and rear driven shafts are offset from the intermediate shaft and the former may extend alongside the engine.

In any of the above-described arrangements, the inertia flywheel may be in the form of a disk which is thickened at the centre to reduce the stress and which may be thickened at the rim. An example of such a flywheel is shown in Figure 6, in which the dimensions of the various parts are indicated by references A to J, and YY denotes the axis about which the flywheel is rotated. The dimensions of the flywheel expressed in terms of A, the radius of the flywheel, and B, the thickness of the rim, are preferably within the following ranges:

$C$ = approx. 1½–4 times B,
$D$ = approx. 10% of A,
$E$ = between 30 and 40% of A,
$F$ = between 5 and 10% of A,
$G$ = between 20 and 25% of A,
$H$ = between 15 and 20% of A,
$I$ = between 5 and 10% of A,
$J$ = from approximately ⅜ the length of B to approximately the same length as B.

The values of A and B are determined by the kinetic energy required in relation to the speed of revolution.

The portions denoted 184 and 185 are preferably approximately parallel and those denoted 186, 187 and 188, 189 may form smooth curves if desired, though for ease of manufacture two portions making different angles with the axis B—B are preferably provided as shown in the drawing.

The flywheel is designed in this form with the object of making the best use of the material within the limitations of diameter (which is limited by structural considerations), and of speed (which is limited by the bearings employed).

It will be understood that the invention can be applied not only to vehicle propulsion systems as described but also to other installations, for example lifts, colliery winding and haulage gear, cranes and earth-moving equipment.

Any of the above-described systems may be modified by arranging that the planetary gearing shown as forming the said differential gearing has its annulus connected or adapted to be connected to said speed controlling means and its sun wheel connected or adapted to be connected to the inertia flywheel.

I claim:

1. A propulsion system comprising a power input shaft, an output shaft, a flywheel, a first train of planetary gearing including three elements, namely a summation first element, a second element and a third element, said summation first element being fast with said output shaft, one of said elements constituting a carrier rotatably mounting planet gears in mesh with the other two elements, said second element being drivably connectable by a third gear train to said flywheel, a second train of planetary gearing including a summation first element, a second element and a third element, one of said elements constituting a carrier rotatably mounting planet gears in mesh with the other two elements, a summation element of said second train being fast with the second element of said first train and thereby with said flywheel, and the second element of said second train being fast with the summation element of said first train, and first and second coupling means, said first coupling means being operable to couple said input shaft to the third element of said first train whereby to establish a driving connection between said input shaft and said output shaft with the output torque in the same direction as the input torque, with the gearing reaction transmitted to said flywheel from the second element of said first train serving to retard the flywheel, and said second coupling means being operable to couple said input shaft to the third element of said second train whereby to establish a driving connection between said input shaft and said output shaft with the output torque in the contrary direction to the input torque with the gearing reaction transmitted to said flywheel from the summation element of said second train serving to accelerate the flywheel.

2. A driving system comprising a power input shaft, an output shaft, a flywheel, a first train of planetary gearing including a sun gear, an annulus gear, and a planet carrier having planet gears that are in mesh with said sun gear and said annulus gear, means drivably coupling said planet carrier to said output shaft, a second train of planetary gearing including a sun gear, an annulus gear and a planet carrier having planet gears that are in mesh with said sun gear and annulus gear, means drivably coupling the planet carrier of said second train to the annulus gear of said first train, means drivably coupling the annulus gear of said second train to the planet carrier of said first train, and means for selectively coupling said power input shaft to the sun gears of said first and second trains, whereby to render said two trains of planetary gearing selectively operative for drivably inter-connecting said input shaft, said output shaft and said flywheel, said driving system also including means operable for selectively arresting and releasing the planet carrier of said second train, and means drivably coupling the annulus gear of the first train to said flywheel including variable speed gearing inter-connecting said flywheel and the planet carrier of said second train.

3. A driving system according to claim 2, wherein said variable speed gearing is capable of adjustment to a condition such that the planet carrier of said second train rotates in the sense opposite to the rotation of said output shaft.

4. A driving system comprising first, second, third and fourth trains of planetary gearing, each of said trains including a sun gear, an annulus gear and a planet carrier having planet gears in mesh with said sun and annulus gears, the planet carrier of said first train being fast with the annulus gear of said second train and the planet carrier of said second train being fast with the annulus gear of said first train, with the planet carrier of said third train and with the annulus gear of said fourth train, means drivably connecting the sun gear of said third train to the sun gear of said fourth train, a flywheel, means drivably connecting said flywheel to the annulus gear of said third train, an intermediate shaft fast with the planet carrier of said first train, an output shaft, means operable for selectively coupling said intermediate shaft to said output shaft and predeterminedly for arresting said intermediate shaft, means operable for selectively arresting or releasing the annulus gear of said first train, means operable for selectively arresting and predeterminedly releasing the planet carrier of said fourth train, means operable for selectively arresting and predeterminedly releasing the sun gear of said third train, means operable for selectively establishing a driving connection between said third train and said flywheel and predeterminedly interrupting said connection, a power input member, and means operable for selectively establishing a driving connection between said power input member and the sun gear of said first train, and predeterminedly between said power input member and the sun gear of said second train.

5. A driving system comprising first, second, third and fourth trains of planetary gearing each of which including a sun gear, an annulus gear and a planet carrier having planet pinions that are in mesh with said sun and annulus gears, the planet carrier of said first train being fast with the annulus gear of said second train and the planet carrier of said second train being fast with the annulus gear of said first train and with the planet carrier of said third train and with the planet carrier of said fourth train, a fifth train of gearing that includes a first sun gear, fast with the planet carrier of said third train, a second sun gear coaxial with said first sun gear, and a planet carrier having compound planet pinions that are on mesh with said first and second sun gears of said fifth train, an intermediate shaft fast with the planet carrier of said first train, an output shaft, a sixth train of gearing comprising an annulus gear fast with said intermediate shaft, a planet carrier fast on said output shaft, and a sun gear, means operable for selectively arresting the sun gear of said sixth train and predeterminedly locking it to the planet carrier of said sixth train, a power input member, means operable for selectively establishing a driving connection between said power input member and the sun gear of said first train and predeterminedly between said power input member and the sun gear of said second train, a flywheel, means drivably connecting said flywheel to the annulus gear of said third train, means operable for selectively arresting and predeterminedly releasing the sun gear of said third train, means operable for selectively coupling the sun gear of said third train to and predeterminedly releasing it from said flywheel, means operable for selectively arresting or releasing the second sun gear of said fifth train, and means operable for selectively arresting and predeterminedly releasing the annulus gear of said fourth train, the gear ratios being such that when the second sun gear of said fifth train is arrested, the annulus gear of said first train rotates in the opposite sense to the respective sun gears of said first and second trains.

6. A driving system comprising a power input shaft, an output shaft, a flywheel, a first train of planetary gearing including a sun gear, an annulus gear, and a planet carrier fast with said output shaft, said planet carrier having planet gears that are in mesh with said sun gear and said annulus gear, said annulus gear being drivingly connectable by a third gear train to said flywheel, a second train of planetary gearing including a sun gear, an annulus gear and a planet carrier having planet gears that are in mesh with said last-mentioned sun gear and annulus gear, the planet carrier of said second train being fast with the annulus gear of said first train and thereby drivingly connectable with said flywheel, and the annulus gear of said second train being fast with the planet carrier of said first train, and first and second coupling means, said first means being operable to couple said input shaft to the sun gear of said first train whereby to establish a driving connection between said input shaft and said output shaft with the output torque in the same direction as the input torque, with the gearing reaction transmitted to said flywheel from the annulus gear of said first train serving to retard the flywheel, and said second coupling means being operable to couple said input shaft to the sun gear of said second train whereby to establish a driving connection between said input shaft and said output shaft with tha output torque in the contrary direction to the input torque with the gearing reaction transmitted to said flywheel from the planet carrier of said second train serving to accelerate the flywheel.

7. A driving system comprising first, second, third and fourth trains of planetary gearing each including a sun gear, an annulus gear and a planet carrier having planet pinions that are in mesh with their respective sun and annulus gears, the planet carrier of said first train being fast with the annulus gear of said second train and the planet carrier of said second train being fast with the annulus gear of said first train and with the planet carrier of said third train and with the planet carrier of said fourth train, a driving connection between the annulus gear of said third train and the sun gear of said fourth train, a fifth train of gearing that includes a first sun gear fast with the planet carrier of said third train, a second sun gear coaxial with said first sun gear, and a planet carrier having planet clusters that are in mesh with said first and second sun gears of said fifth train, a driving connection between the annulus gear of said fourth gear train and the planet carrier of said fifth gear train, an intermediate shaft fast with the planet carrier of said first train, an output shaft, a driving connection between said intermediate and output shafts, a power input member, means operable for selectively establishing a driving connection between said power input member and the sun gear of said first train and predeterminedly between said power input member and the sun gear of said second train, a flywheel, means drivably connecting said flywheel to the annulus gear of said third train, means operable for selectively arresting and predeterminedly releasing the sun gear of said third train, means operable for selectively coupling the sun gear of said third train to and predeterminedly releasing it from the annulus gear of said third train, means operable for selectively arresting and predeterminedly releasing the second sun gear of said fifth train, and means operable for selectively arresting and predeterminedly releasing the annulus gear of said fourth train, the gear ratios being such that when the second sun gear of said fifth train is arrested the annulus gear of said first train rotates in the opposite sense to the respective sun gears of said first and second trains.

8. A driving system according to claim 1, including between said flywheel and the summation element of said second train, variable speed gearing capable of adjustment to a condition such that the summation element of said second train rotates in the sense opposite to the rotation of said output shaft.

References Cited in the file of this patent

UNITED STATES PATENTS

| | | |
|---|---|---|
| 874,580 | Farkas et al. | Dec. 24, 1907 |
| 1,076,614 | Thomas | Oct. 21, 1913 |
| 1,335,249 | Leymarie | Mar. 30, 1920 |
| 1,956,078 | Mueller | Apr. 24, 1934 |
| 2,118,590 | Chilton | May 24, 1938 |
| 2,137,574 | Kramer | Nov. 22, 1938 |
| 2,196,064 | Erban | Apr. 2, 1940 |
| 2,525,946 | Roberts | Oct. 17, 1950 |
| 2,540,639 | Winther et al. | Feb. 6, 1951 |
| 2,546,378 | Winther | Mar. 27, 1951 |